(12) United States Patent
Nomaru (10) Patent No.: US 9,358,637 B2
(45) Date of Patent: Jun. 7, 2016

(54) LASER BEAM SPOT SHAPE DETECTING METHOD

(75) Inventor: Keiji Nomaru, Ota-Ku (JP)

(73) Assignee: Disco Corporation, Tokyo (JP)

( * ) Notice: Subject to any disclaimer, the term of this patent is extended or adjusted under 35 U.S.C. 154(b) by 118 days.

(21) Appl. No.: 13/554,561

(22) Filed: Jul. 20, 2012

(65) Prior Publication Data

US 2013/0027690 A1    Jan. 31, 2013

(30) Foreign Application Priority Data

Jul. 25, 2011 (JP) ................................ 2011-162089

(51) Int. Cl.

| | |
|---|---|
| G01J 1/00 | (2006.01) |
| B23K 26/04 | (2014.01) |
| G01J 1/42 | (2006.01) |
| G01J 1/58 | (2006.01) |
| B23K 26/08 | (2014.01) |
| B23K 26/40 | (2014.01) |

(52) U.S. Cl.
CPC ........... *B23K 26/046* (2013.01); *B23K 26/0884* (2013.01); *B23K 26/40* (2013.01); *B23K 26/705* (2015.10); *G01J 1/4257* (2013.01); *G01J 1/58* (2013.01); *B23K 2203/50* (2015.10)

(58) Field of Classification Search
CPC .. G01B 11/0608; G01B 11/24; B23K 26/046; G01J 1/4257; G01J 9/00; G01M 11/061; G01M 11/064; G01M 11/06
USPC .................... 356/614, 121, 237.2–237.6, 622
See application file for complete search history.

(56) References Cited

U.S. PATENT DOCUMENTS

| | | | | |
|---|---|---|---|---|
| 4,608,494 | A * | 8/1986 | Kobayashi | H01L 21/681 250/458.1 |
| 5,885,840 | A * | 3/1999 | Kamentsky | G01N 15/1475 356/317 |
| 6,051,835 | A * | 4/2000 | Pettipiece et al. | 250/339.09 |
| 7,158,226 | B2 * | 1/2007 | Gfrorer et al. | 356/318 |
| 8,610,030 | B2 * | 12/2013 | Oba et al. | 219/121.83 |
| 2001/0046050 | A1* | 11/2001 | Hoyt | 356/417 |
| 2007/0171411 | A1* | 7/2007 | Corson | G01N 21/6428 356/318 |
| 2008/0245779 | A1* | 10/2008 | Nomaru et al. | 219/121.75 |
| 2009/0064521 | A1* | 3/2009 | Sawabe et al. | 33/645 |
| 2009/0066969 | A1* | 3/2009 | Sawabe et al. | 356/614 |
| 2009/0266802 | A1* | 10/2009 | Sawabe et al. | 219/121.67 |

FOREIGN PATENT DOCUMENTS

| | | |
|---|---|---|
| JP | 10-305420 | 11/1998 |
| JP | 2001-284281 | 10/2001 |
| JP | 2002-192370 | 7/2002 |
| JP | 2004-119617 | 4/2004 |
| JP | 2005-214726 | 8/2005 |

* cited by examiner

*Primary Examiner* — Tarifur Chowdhury
*Assistant Examiner* — Isiaka Akanbi
(74) *Attorney, Agent, or Firm* — Greer Burns & Crain Ltd.

(57) ABSTRACT

The spot shape of a laser beam is detected by moving a table holding a detection substrate having a luminescent substance in an X direction and a Y direction with a laser beam focused by a lens applied to an area of the detection substrate where the luminescent substance is located. The intensity of light emitted from the luminescent substance is detected during the movement of the table, and a light intensity map is prepared indicating the light intensities detected in the light intensity detecting step at all of the X and Y coordinates of the luminescent substance. Spot shape images of the laser beam are formed according to a plurality of light intensity maps obtained by positioning the focusing lens at a plurality of detection positions changed in a Z direction perpendicular to a holding surface of the table.

3 Claims, 7 Drawing Sheets

Light intensity map

| | x1 | | | | x5 | | | | | x10 | | xn-1 | xn |
|---|---|---|---|---|---|---|---|---|---|---|---|---|---|
| yn | 1 | 1 | 1 | 1 | 1 | 1 | 1 | 1 | 1 | 1 | ... | 1 | 1 |
| yn-1 | 1 | 1 | 1 | 1 | 1 | 1 | 1 | 3 | 4 | 5 | | 1 | 1 |
| | | | | | ⋮ | | | | | | | ⋮ | |
| y10 | 1 | 5 | 10 | 10 | 10 | 10 | 10 | 10 | 10 | 10 | | 5 | 1 |
| | 1 | 4 | 10 | 10 | 10 | 10 | 10 | 10 | 10 | 10 | | 4 | 1 |
| | 1 | 3 | 10 | 10 | 10 | 10 | 10 | 10 | 10 | 10 | | 3 | 1 |
| | 1 | 1 | 7 | 10 | 10 | 10 | 10 | 10 | 10 | 10 | | 1 | 1 |
| | 1 | 1 | 3 | 10 | 10 | 10 | 10 | 10 | 10 | 10 | ... | 1 | 1 |
| y5 | 1 | 1 | 1 | 5 | 10 | 10 | 10 | 10 | 10 | 10 | | 1 | 1 |
| | 1 | 1 | 1 | 1 | 5 | 10 | 10 | 10 | 10 | 10 | | 1 | 1 |
| | 1 | 1 | 1 | 1 | 1 | 4 | 7 | 10 | 10 | 10 | | 1 | 1 |
| | 1 | 1 | 1 | 1 | 1 | 1 | 1 | 3 | 4 | 5 | | 1 | 1 |
| y1 | 1 | 1 | 1 | 1 | 1 | 1 | 1 | 1 | 1 | 1 | | 1 | 1 |

FIG.8

LASER BEAM SPOT SHAPE DETECTING METHOD

BACKGROUND OF THE INVENTION

1. Field of the Invention

The present invention relates to a laser beam spot shape detecting method of detecting the spot shape of a laser beam oscillated by laser beam oscillating means and focused by focusing means in a laser processing apparatus.

2. Description of the Related Art

In a semiconductor device fabrication process, a plurality of crossing division lines are formed on the front side of a substantially disk-shaped semiconductor wafer to thereby partition a plurality of regions where devices such as ICs and LSIs are respectively formed. The semiconductor wafer thus formed is cut along the division lines to thereby divide the regions where the devices are formed from each other, thus obtaining the individual devices. Further, an optical device wafer is provided by forming a gallium nitride compound semiconductor or the like on the front side of a sapphire substrate or a silicon carbide substrate. The optical device wafer is also cut along the division lines to obtain individual optical devices divided from each other, such as light emitting diodes and laser diodes, which are widely used in electric equipment.

As a method of dividing such a wafer as mentioned above along the division lines, there has been proposed a method including the steps of applying a pulsed laser beam having an absorption wavelength to the wafer along the division lines to thereby form laser processed grooves as a break start point on the wafer along the division lines and next applying an external force to the wafer along the division lines where the laser processed grooves are respectively formed, thereby breaking the wafer along the division lines (see Japanese Patent Laid-open No. Hei 10-305420, for example).

As another method of dividing such a wafer as mentioned above along the division lines, there has been tried a dividing method using a laser processing method including the step of applying a pulsed laser beam having a transmission wavelength to the wafer in the condition where the focal point of the pulsed laser beam is set inside the wafer in an area to be divided. The dividing method using this laser processing method includes the steps of applying a pulsed laser beam having a transmission wavelength to the wafer from one side of the wafer in the condition where the focal point of the pulsed laser beam is set inside the wafer, thereby continuously forming modified layers inside the wafer along the division lines and next applying an external force along the division lines where the modified layers are respectively formed to be reduced in strength, thereby breaking the wafer along the division lines (see Japanese Patent No. 3408805, for example).

However, focusing means for focusing the laser beam oscillated by laser beam oscillating means is configured by a combination lens composed of a plurality of convex lenses and concave lenses. Further, an optical system provided between the laser beam oscillating means and the focusing means has distortion. Accordingly, the shape of a focused spot on the wafer does not always become an intended shape such as a circular shape. It is known that the shape and size of the focused spot of a laser beam have an influence on the quality of laser processing. Therefore, the shape and size of the focused spot of a laser beam to be applied to a workpiece such as a wafer are detected.

SUMMARY OF THE INVENTION

The detection of the spot shape and the focal position of a laser beam to be applied to a workpiece such as a wafer is performed by a method including the steps of forming the spot of the laser beam on an obscure glass substrate and next imaging the spot from the back side of the obscure glass substrate by using a CCD camera. However, the spot shape and the focal position cannot be accurately detected because of scattered light from the obscure glass substrate.

It is therefore an object of the present invention to provide a laser beam spot shape detecting method which can accurately detect the spot shape and the focal position (focal length) of a laser beam.

In accordance with an aspect of the present invention, there is provided a laser beam spot shape detecting method of detecting the spot shape of a laser beam oscillated by laser beam oscillating means and focused by focusing means, the laser beam spot shape detecting method including a detection substrate holding step of holding a detection substrate on a holding surface of a table movable in an X direction and a Y direction, the detection substrate having a luminescent substance formed from a minute particle capable of emitting light by the application of the laser beam thereto; a laser beam applying step of applying the laser beam oscillated by the laser beam oscillating means and focused by the focusing means to an area of the detection substrate held on the table where the luminescent substance is located, the laser beam having a predetermined power that cannot process the detection substrate and the luminescent substance; a light intensity detecting step of moving the table in the X direction and the Y direction relatively to the focusing means in the condition where the laser beam is applied to the area of the detection substrate held on the table where the luminescent substance is located and detecting the intensity of light emitted from the luminescent substance by using a photodetector during the movement of the table; a light intensity map preparing step of preparing a light intensity map indicating the light intensities detected in the light intensity detecting step at all of the X and Y coordinates of the luminescent substance; and a spot shape image forming step of forming spot shape images of the laser beam according to a plurality of light intensity maps obtained by positioning the focusing means at a plurality of detection positions changed in a Z direction perpendicular to the holding surface of the table and performing the light intensity detecting step and the light intensity map preparing step at the plurality of detection positions.

Preferably, the luminescent substance has a particle size of 30 to 100 nm. Preferably, the luminescent substance is provided by a single fluorescent particle.

As described above, the laser beam spot shape detecting method according to the present invention includes the detection substrate holding step of holding the detection substrate on the holding surface of the table movable in the X direction and the Y direction, the detection substrate having the luminescent substance formed from the minute particle capable of emitting light by the application of the laser beam thereto; the laser beam applying step of applying the laser beam oscillated by the laser beam oscillating means and focused by the focusing means to the area of the detection substrate held on the table where the luminescent substance is located, the laser beam having the predetermined power that cannot process the detection substrate and the luminescent substance; the light intensity detecting step of moving the table in the X direction and the Y direction in the condition where the laser beam is applied to the area of the detection substrate held on the table where the luminescent substance is located and detecting the intensity of light emitted from the luminescent substance by using the photodetector during the movement of the table; the light intensity map preparing step of preparing the light intensity map indicating the light intensities detected in the light intensity detecting step at all of the X and Y coordinates of the luminescent substance; and the spot shape image forming step of forming the spot shape images of the laser beam according to the plural light intensity maps obtained by positioning the focusing means at the plural detection positions changed in the Z direction perpendicular to the holding surface of the table and performing the light intensity detecting step and the light intensity map preparing step at the plural detection positions. Accordingly, the contour (spot shape) of the spot as the boundary of the spot can be obtained according to each light intensity map.

Further, of all the spots detected at the plural detection positions changed in the Z direction perpendicular to the holding surface of the table, the spot having a minimum size (area) becomes a focused spot, so that the size (area) of the focused spot can be obtained and the focal length of the focusing means can also be accurately obtained.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENT

Figure 1:
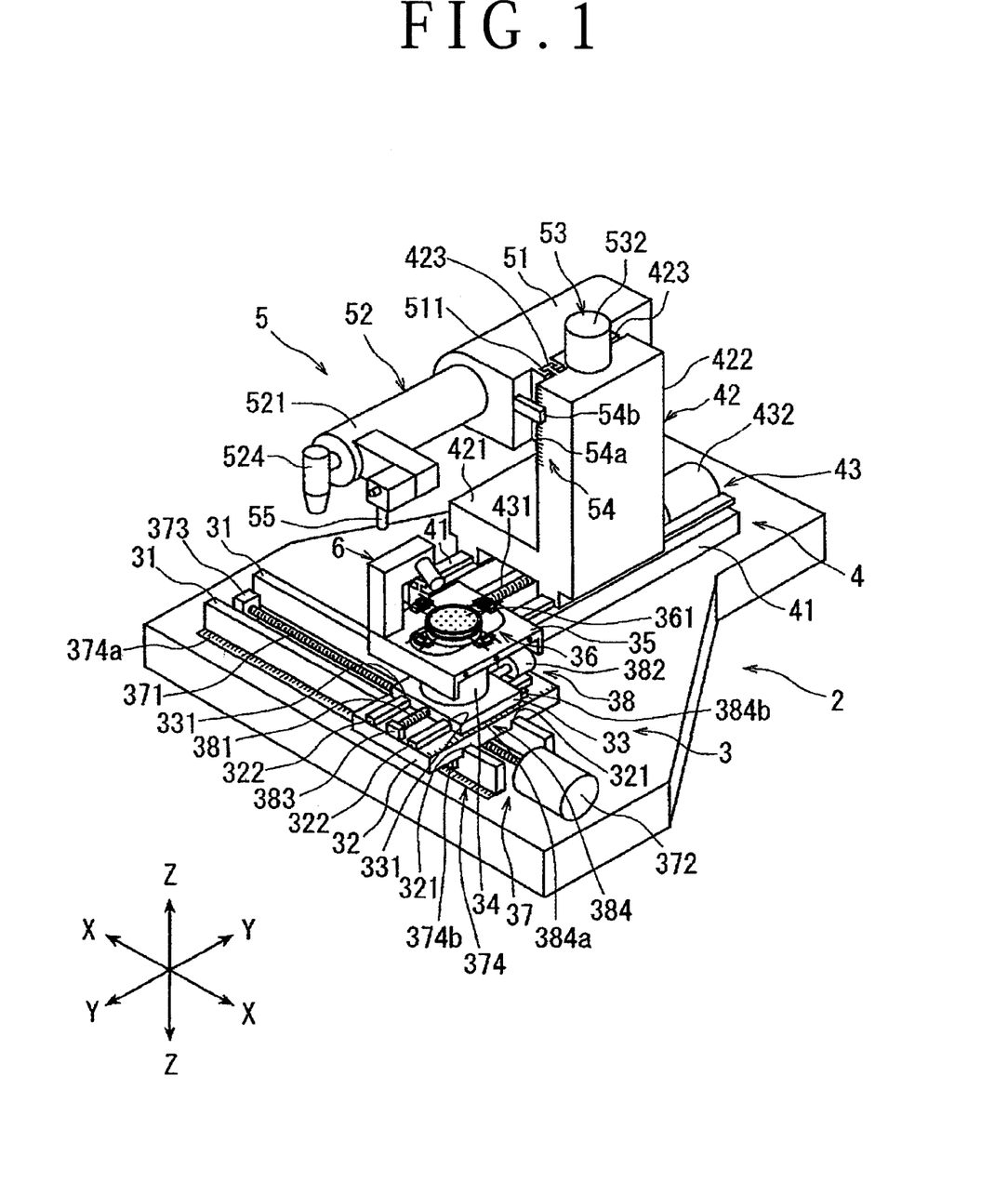
FIG. 1 is a perspective view of a laser processing apparatus for performing the laser beam spot shape detecting method according to the present invention.

A preferred embodiment of the laser beam spot shape detecting method according to the present invention will now be described in detail with reference to the attached drawings. FIG. 1 is a perspective view of a laser processing apparatus for performing the laser beam spot shape detecting method according to the present invention. The laser processing apparatus shown in FIG. 1 includes a stationary base 2, a chuck table mechanism 3 for holding a measurement object, the chuck table mechanism 3 being provided on the stationary base 2 so as to be movable in an X direction shown by an arrow X, a laser beam applying unit supporting mechanism 4 provided on the stationary base 2 so as to be movable in a Y direction shown by an arrow Y perpendicular to the X direction, and a laser beam applying unit 5 provided on the laser beam applying unit supporting mechanism 4 so as to be movable in a Z direction shown by an arrow Z perpendicular to the X direction and the Y direction.

The chuck table mechanism 3 includes a pair of guide rails 31 provided on the stationary base 2 so as to extend parallel to each other in the X direction, a first slide block 32 provided on the guide rails 31 so as to be movable in the X direction, a second slide block 33 provided on the first slide block 32 so as to be movable in the Y direction, a support table 35 supported by a cylindrical member 34 standing on the second slide block 33, and a chuck table 36 as holding means for holding a measurement object. The chuck table 36 has a vacuum chuck 361 formed of a porous material. A measurement object is adapted to be held under suction on the upper surface of the vacuum chuck 361 as a holding surface by operating suction means (not shown). The chuck table 36 is rotatable by a pulse motor (not shown) provided in the cylindrical member 34. Further, the chuck table 36 is provided with clamps 362 for fixing an annular frame supporting the measurement object through a protective tape.

The lower surface of the first slide block 32 is formed with a pair of guided grooves 321 for slidably engaging the pair of guide rails 31 mentioned above. A pair of guide rails 322 are provided on the upper surface of the first slide block 32 so as to extend parallel to each other in the Y direction. Accordingly, the first slide block 32 is movable in the X direction along the guide rails 31 by the slidable engagement of the guided grooves 321 with the guide rails 31. The chuck table mechanism 3 according to the preferred embodiment shown in the drawing further includes X-direction moving means 37 for moving the first slide block 32 in the X direction along the guide rails 31. The X-direction moving means 37 includes an externally threaded rod 371 extending parallel to the guide rails 31 so as to be interposed therebetween and a pulse motor 372 as a drive source for rotationally driving the externally threaded rod 371. The externally threaded rod 371 is rotatably supported at one end thereof to a bearing block 373 fixed to the stationary base 2 and is connected at the other end to the output shaft of the pulse motor 372 so as to receive the torque thereof. The externally threaded rod 371 is engaged with a tapped through hole formed in an internally threaded block (not shown) projecting from the lower surface of the first slide block 32 at a central portion thereof. Accordingly, the first slide block 32 is moved in the X direction along the guide rails 31 by operating the pulse motor 372 to normally or reversely rotate the externally threaded rod 371.

The laser processing apparatus according to the preferred embodiment shown in the drawing includes X-position detecting means 374 for detecting the X position of the chuck table 36 in the X direction. The X-position detecting means 374 includes a linear scale 374a extending along one of the guide rails 31 and a read head 374b provided on the first slide block 32 and movable along the linear scale 374a together with the first slide block 32. The read head 374b of the X-position detecting means 374 transmits a pulse signal of one pulse every 0.1 μm in this preferred embodiment to control means which will be hereinafter described. This control means counts the number of pulses as the pulse signal input from the read head 374b to thereby detect the X position of the chuck table 36.

The lower surface of the second slide block 33 is formed with a pair of guided grooves 331 for slidably engaging the pair of guide rails 322 provided on the upper surface of the first slide block 32 as mentioned above. Accordingly, the second slide block 33 is movable in the Y direction along the guide rails 322 by the slidable engagement of the guided grooves 331 with the guide rails 322. The chuck table mechanism 3 according to the preferred embodiment shown in the drawing further includes first Y-direction moving means 38 for moving the second slide block 33 in the Y direction along the guide rails 322 provided on the first slide block 32. The first Y-direction moving means 38 includes an externally threaded rod 381 extending parallel to the guide rails 322 so as to be interposed therebetween and a pulse motor 382 as a drive source for rotationally driving the externally threaded rod 381. The externally threaded rod 381 is rotatably supported at one end thereof to a bearing block 383 fixed to the upper surface of the first slide block 32 and is connected at the other end to the output shaft of the pulse motor 382 so as to receive the torque thereof. The externally threaded rod 381 is engaged with a tapped through hole formed in an internally threaded block (not shown) projecting from the lower surface of the second slide block 33 at a central portion thereof. Accordingly, the second slide block 33 is moved in the Y direction along the guide rails 322 by operating the pulse motor 382 to normally or reversely rotate the externally threaded rod 381.

The laser processing apparatus includes Y-position detecting means 384 for detecting the Y position of the chuck table 36 in the Y direction. The Y-position detecting means 384 includes a linear scale 384a extending along one of the guide rails 322 and a read head 384b provided on the second slide block 33 and movable along the linear scale 384a together with the second slide block 33. The read head 384b of the Y-position detecting means 384 transmits a pulse signal of one pulse every 0.1 μm in this preferred embodiment to the control means to be described later. This control means counts the number of pulses as the pulse signal input from the read head 384b to thereby detect the Y position of the chuck table 36.

The laser beam applying unit supporting mechanism 4 includes a pair of guide rails 41 provided on the stationary base 2 so as to extend parallel to each other in the Y direction and a movable support base 42 provided on the guide rails 41 so as to be movable in the Y direction. The movable support base 42 is composed of a horizontal portion 421 slidably supported to the guide rails 41 and a vertical portion 422 extending vertically upward from the upper surface of the horizontal portion 421. Further, a pair of guide rails 423 are provided on one side surface of the vertical portion 422 so as to extend parallel to each other in the Z direction. The laser beam applying unit supporting mechanism 4 further includes second Y-direction moving means 43 for moving the movable support base 42 in the Y direction along the guide rails 41. The second Y-direction moving means 43 includes an externally threaded rod 431 extending parallel to the guide rails 41 so as to be interposed therebetween and a pulse motor 432 as a drive source for rotationally driving the externally threaded rod 431. The externally threaded rod 431 is rotatably supported at one end thereof to a bearing block (not shown) fixed to the stationary base 2 and is connected at the other end to the output shaft of the pulse motor 432 so as to receive the torque thereof. The externally threaded rod 431 is engaged with a tapped through hole formed in an internally threaded block (not shown) projecting from the lower surface of the horizontal portion 421 constituting the movable support base 42 at a central portion thereof. Accordingly, the movable support base 42 is moved in the Y direction along the guide rails 41 by operating the pulse motor 432 to normally or reversely rotate the externally threaded rod 431.

The laser beam applying unit 5 includes a unit holder 51 and laser beam applying means 52 mounted to the unit holder 51. The unit holder 51 is formed with a pair of guided grooves 511 for slidably engaging the pair of guide rails 423 provided on the vertical portion 422 of the movable support base 42. Accordingly, the unit holder 51 is supported to the movable support base 42 so as to be movable in the Z direction along the guide rails 423 by the slidable engagement of the guided grooves 511 with the guide rails 423.

Figure 2:
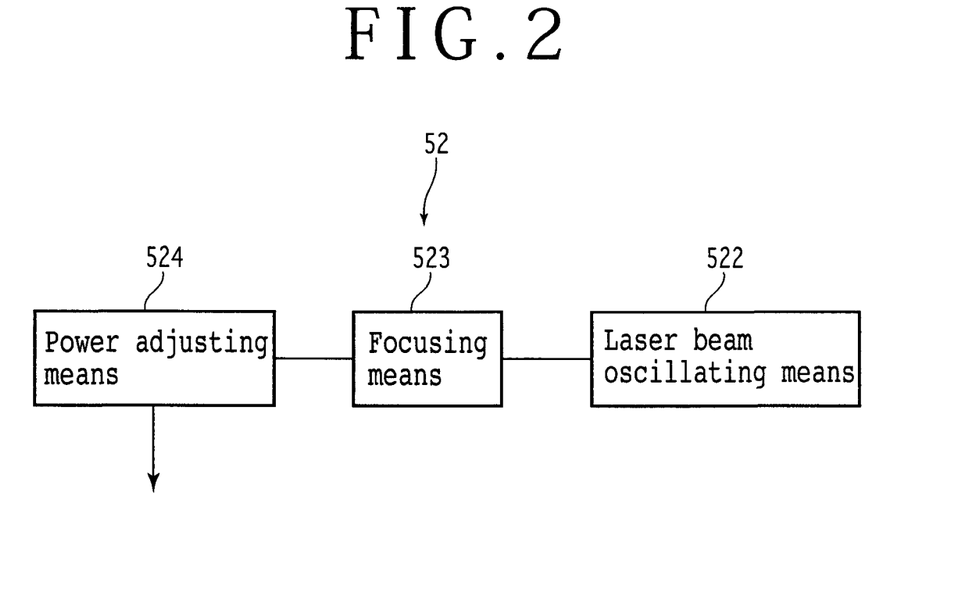
FIG. 2 is a block diagram showing the configuration of laser beam applying means included in the laser processing apparatus shown in FIG. 1.

The laser beam applying means 52 includes a cylindrical casing 521 fixed to the unit holder 51 so as to extend in a substantially horizontal direction. As shown in FIG. 2, the laser beam applying means 52 includes laser beam oscillating means 522 and power adjusting means 523 both contained in the casing 521. The laser beam oscillating means 522 and the power adjusting means 523 are controlled by the control means to be described later. The laser beam applying means 52 further includes focusing means (condenser) 524 for focusing a laser beam oscillated by the laser beam oscillating means 522 and adjusted in power by the power adjusting means 523 and applying this laser beam to the measurement object held on the chuck table 36. The focusing means 524 is configured by a combination lens composed of a plurality of convex lenses and concave lenses. The focusing means 524 is mounted on the front end of the casing 521.

Referring back to FIG. 1, imaging means 55 for detecting a subject area of a workpiece to be laser-processed by the laser beam applied from the focusing means 524 is provided at the front end portion of the casing 521 constituting the laser beam applying means 52. The imaging means 55 includes illuminating means for illuminating the workpiece, an optical system for capturing an area illuminated by the illuminating means, and an imaging device (CCD) for imaging the area captured by the optical system. An image signal output from the imaging means 55 is transmitted to the control means (not shown).

The laser processing apparatus shown in FIG. 1 further includes Z-direction moving means 53 for moving the laser beam applying unit 5 along the guide rails 423 in the Z direction. Like the X-direction moving means 37, the first Y-direction moving means 38, and the second Y-direction moving means 43, the Z-direction moving means 53 includes an externally threaded rod (not shown) extending parallel to the guide rails 423 so as to be interposed therebetween and a pulse motor 532 as a drive source for rotationally driving this externally threaded rod. Accordingly, the laser beam applying unit 5 is moved in the Z direction along the guide rails 423 by operating the pulse motor 532 to normally or reversely rotate this externally threaded rod.

The laser processing apparatus shown in FIG. 1 further includes Z-position detecting means 54 for detecting the Z position of the laser beam applying means 52. The Z-position detecting means 54 includes a linear scale 54a extending parallel to the guide rails 423 and a read head 54b provided on the unit holder 51 and movable along the linear scale 54a together with the unit holder 51. The read head 54b of the Z-position detecting means 54 transmits a pulse signal of one pulse every 0.1 μm in this preferred embodiment to the control means to be described later. This control means counts the number of pulses as the pulse signal input from the read head 54b to thereby detect the Z position of the laser beam applying means 52.

Figure 3:
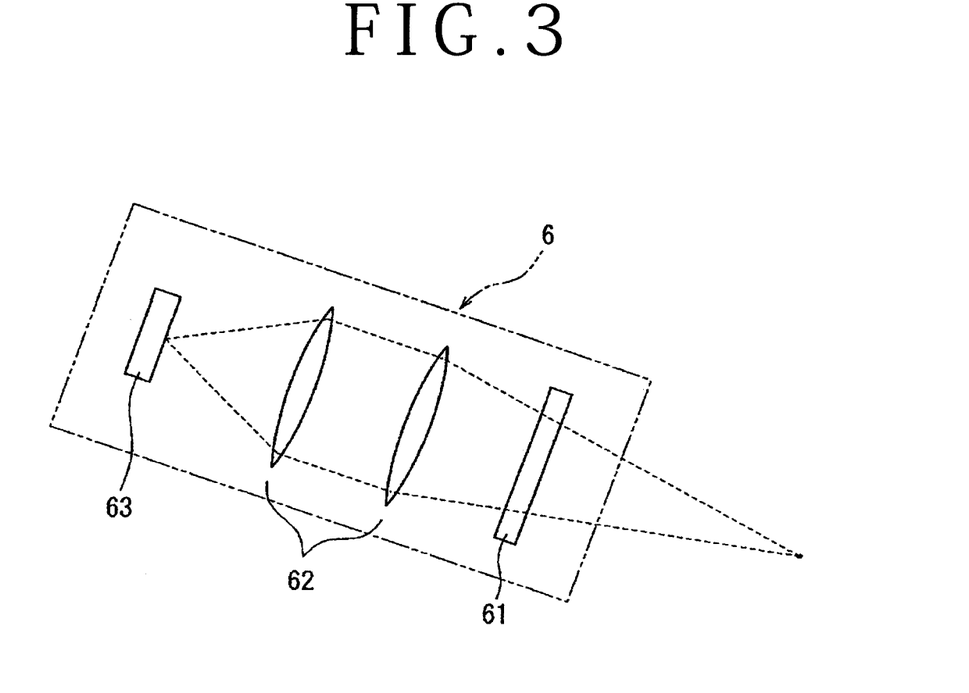
FIG. 3 is a schematic diagram showing the configuration of a photodetector detachably mounted on a support table constituting a chuck table mechanism included in the laser processing apparatus shown in FIG. 1.

The laser processing apparatus shown in FIG. 1 further includes a photodetector 6 detachably mounted on the support table 35 constituting the chuck table mechanism 3. As shown in FIG. 3, the photodetector 6 is composed of a bandpass filter 61 for passing only the wavelength of light emitted from a luminescent substance held on a detection substrate (which will be hereinafter described) held on the chuck table 36 constituting the chuck table mechanism 3, an image forming lens 62 for forming an image from the light passed through the bandpass filter 61, and a photomultiplier 63 for detecting the image formed by the image forming lens 62 and outputting a light intensity signal. Thus, the photodetector 6 configured as above functions to detect the light emitted from the luminescent substance fixed to the detection substrate to be described later held on the chuck table 36 and to transmit a voltage signal corresponding to the intensity of the light detected to the control means to be described later.

Figure 4:
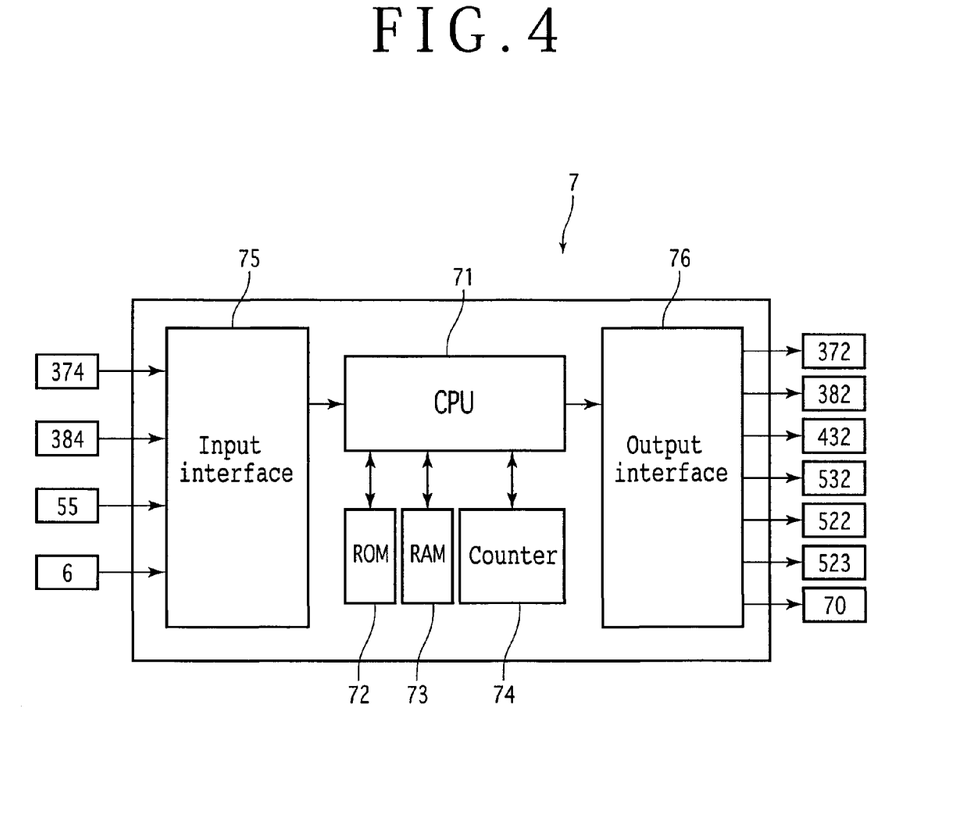
FIG. 4 is a block diagram showing the configuration of control means included in the laser processing apparatus shown in FIG. 1.

The laser processing apparatus shown in FIG. 1 further includes control means 7 shown in FIG. 4. The control means 7 is configured by a computer, and it includes a central processing unit (CPU) 71 for performing operational processing according to a control program, a read only memory (ROM) 72 preliminarily storing the control program, a random access memory (RAM) (read/write memory) 73 for storing the results of computation, etc., a counter 74, an input interface 75, and an output interface 76. Detection signals from the X-position detecting means 374, the Y-position detecting means 384, the imaging means 55, and the photodetector 6 are input into the input interface 75 of the control means 7. On the other hand, control signals are output from the output interface 76 of the control means 7 to the pulse motor 372, the pulse motor 382, the pulse motor 432, the pulse motor 532, the laser beam oscillating means 522, the power adjusting means 523, and display means 70.

Figure 5:
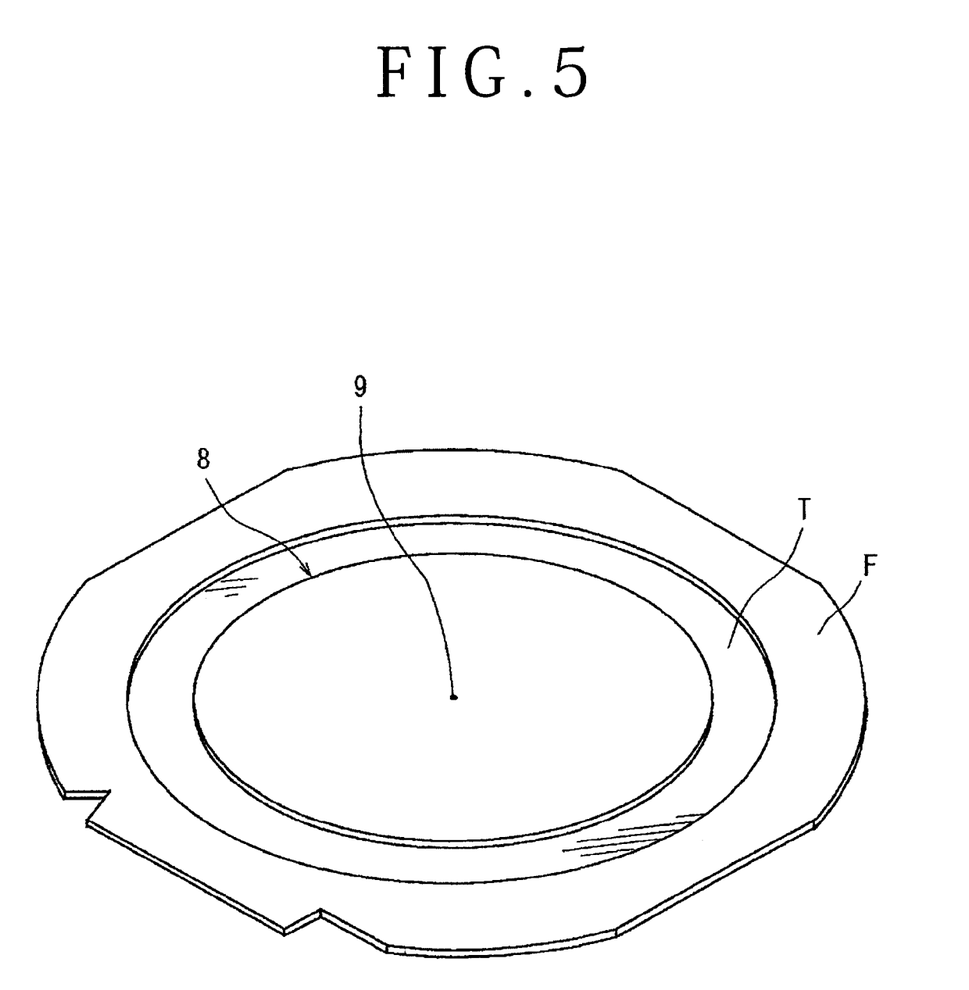
FIG. 5 is a perspective view of a detection substrate supported through an adhesive tape to an annular frame by performing a detection substrate supporting step in the laser beam spot shape detecting method according to the present invention.

The operation of the laser processing apparatus configured above will now be described. Prior to detecting the spot shape of the laser beam applied from the focusing means 524 of the laser beam applying means 52 in the laser processing apparatus, a detection substrate 8 is attached to the front side (adhesive surface) of an adhesive tape T supported to an annular frame F as shown in FIG. 5 (detection substrate supporting step). In this preferred embodiment, the detection substrate 8 is formed from a circular glass substrate. A luminescent substance 9 capable of emitting light by the application of the laser beam thereto is fixed to the front side (upper surface) of the detection substrate 8 at the center thereof. The luminescent substance 9 is provided by a single fluorescent particle having a particle size of 30 to 100 nm. For example, a fluorescent silica nano-particle may be used as the single fluorescent particle.

After performing the detection substrate supporting step mentioned above, the detection substrate 8 attached to the adhesive tape T is placed on the chuck table 36 of the laser processing apparatus shown in FIG. 1 in the condition where the front side of the detection substrate 8 is oriented upward, that is, in the condition where the adhesive tape T comes into contact with the upper surface of the chuck table 36. In this condition, the suction means (not shown) is operated to thereby hold the detection substrate 8 through the adhesive tape T on the chuck table 36 under suction (detection substrate holding step). Further, the annular frame F supporting the detection substrate 8 through the adhesive tape T is fixed by the clamps 362 provided on the chuck table 36. Thereafter, the X-direction moving means 37 and the first Y-direction moving means 38 are operated to move the chuck table 36 holding the detection substrate 8 through the adhesive tape T under suction to a position such that the center of the chuck table 36 is positioned directly below the focusing means 524 of the laser beam applying means 52.

In the condition where the center of the chuck table 36 is positioned directly below the focusing means 524 of the laser beam applying means 52, the laser beam applying means 52 is operated to apply a laser beam from the focusing means 524 to an area of the detection substrate 8 held on the chuck table 36 where the luminescent substance 9 fixed to the detection substrate 8 is located. The power of the laser beam to be applied to the detection substrate 8 is set to a predetermined value (e.g., 0.01 W) which cannot process the detection substrate 8 and the luminescent substance 9 (laser beam applying step).

Figure 6:
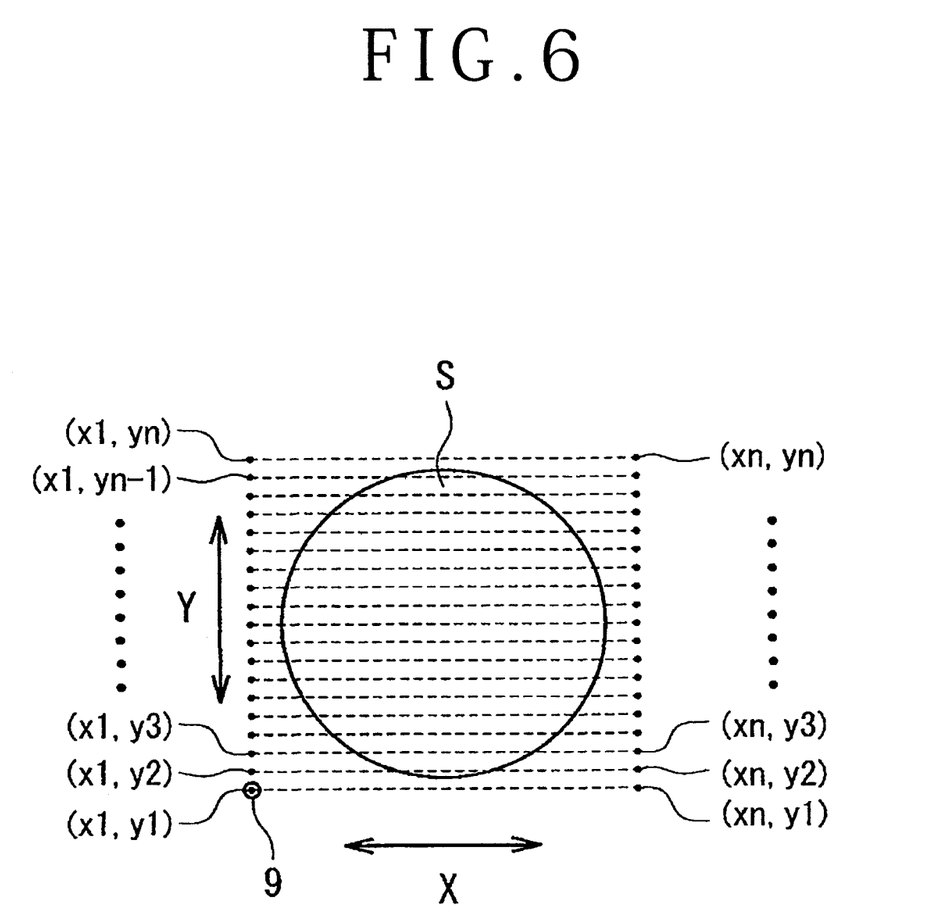
FIG. 6 is a schematic diagram for illustrating a light intensity detecting step in the laser beam spot shape detecting method according to the present invention.

Thereafter, the Z-direction moving means 53 is operated to move the focusing means 524 of the laser beam applying means 52 in the Z direction to a first detection position (Z1) where the focal point of the laser beam to be focused by the focusing means 524 is higher in level than the front side (upper surface) of the detection substrate 8 held on the chuck table 36 by a predetermined amount as a design value. Thereafter, a light intensity detecting step is performed in such a manner that the chuck table 36 is moved in the X direction and the Y direction in the condition where the laser beam is applied to the area of the detection substrate 8 held on the chuck table 36 where the luminescent substance 9 fixed to the detection substrate 8 is located and that the intensity of light emitted from the luminescent substance 9 is detected by the photodetector 6 during the movement of the chuck table 36. This light intensity detecting step will now be described in more detail with reference to FIG. 6. FIG. 6 exaggeratedly shows the spot S of the laser beam applied from the focusing means 524 of the laser beam applying means 52 to the detection substrate 8 and the luminescent substance 9 fixed to the detection substrate 8. The control means 7 operates the X-direction moving means 37 and the first Y-direction moving means 38 to move the chuck table 36 in the X direction and the Y direction so that the luminescent substance 9 fixed to the detection substrate 8 held on the chuck table 36 is positioned at the coordinates (x1, y1), for example, according to the detection signals from the X-position detecting means 374 and the Y-position detecting means 384. Thereafter, the X-direction moving means 37 is operated to move the chuck table 36 so that the position of the luminescent substance 9 is shifted to the coordinates (xn, y1). The movement of the chuck table 36 causes the movement of the luminescent substance 9 from an area where the spot S of the laser beam is absent through an area where the spot S is present to an area where the spot S is absent. As a result, in the area where the spot S is absent, the luminescent substance 9 which moves as above is not irradiated with the laser beam and does not emit light, whereas in the area where the spot S is present, the luminescent substance 9 is irradiated with the laser beam and therefore emits light at high intensity. At the boundary of the spot S, the luminescent substance 9 is partially irradiated with the laser beam and therefore emits light at relatively low intensity. During the movement of the luminescent substance 9, the photodetector 6 detects the light emitted from the luminescent substance 9 and transmits a light intensity signal corresponding to the intensity of the detected light to the control means 7. The control means 7 stores the light intensities corresponding to the coordinate values changing with the pitch of 0.1 µm into the random access memory (RAM) 73 according to the light intensity signal from the photodetector 6 and the detection signals from the X-position detecting means 374 and the Y-position detecting means 384.

After scanning the luminescent substance 9 from the coordinates (x1, y1) to the coordinates (xn, y1) as mentioned above, the X-direction moving means 37 and the first Y-direction moving means 38 are operated to move the chuck table 36 in the X direction and the Y direction so that the luminescent substance 9 fixed to the detection substrate 8 held on the chuck table 36 is positioned at the coordinates (x1, y2), for example, according to the detection signals from the X-position detecting means 374 and the Y-position detecting means 384. Thereafter, the X-direction moving means 37 is operated to move the chuck table 36 so that the position of the luminescent substance 9 is shifted to the coordinates (xn, y2). During the movement of the luminescent substance 9, the photodetector 6 detects the light emitted from the luminescent substance 9 and transmits a light intensity signal corresponding to the intensity of the detected light to the control means 7. The control means 7 stores the light intensities corresponding to the coordinate values changing with the pitch of 0.1 μm into the random access memory (RAM) 73 according to the light intensity signal from the photodetector 6 and the detection signals from the X-position detecting means 374 and the Y-position detecting means 384. Thereafter, the control means 7 similarly scans the luminescent substance 9 from the coordinates (x1, y3) to the coordinates (xn, y3) and successively scans the luminescent substance 9 from the coordinates (x1, yn) to the coordinates (xn, yn) in a similar manner, then storing the intensities of the light emitted from the luminescent substance 9 at all of the coordinates (x, y) and detected by the photodetector 6 to the random access memory (RAM) 73.

Figure 7:
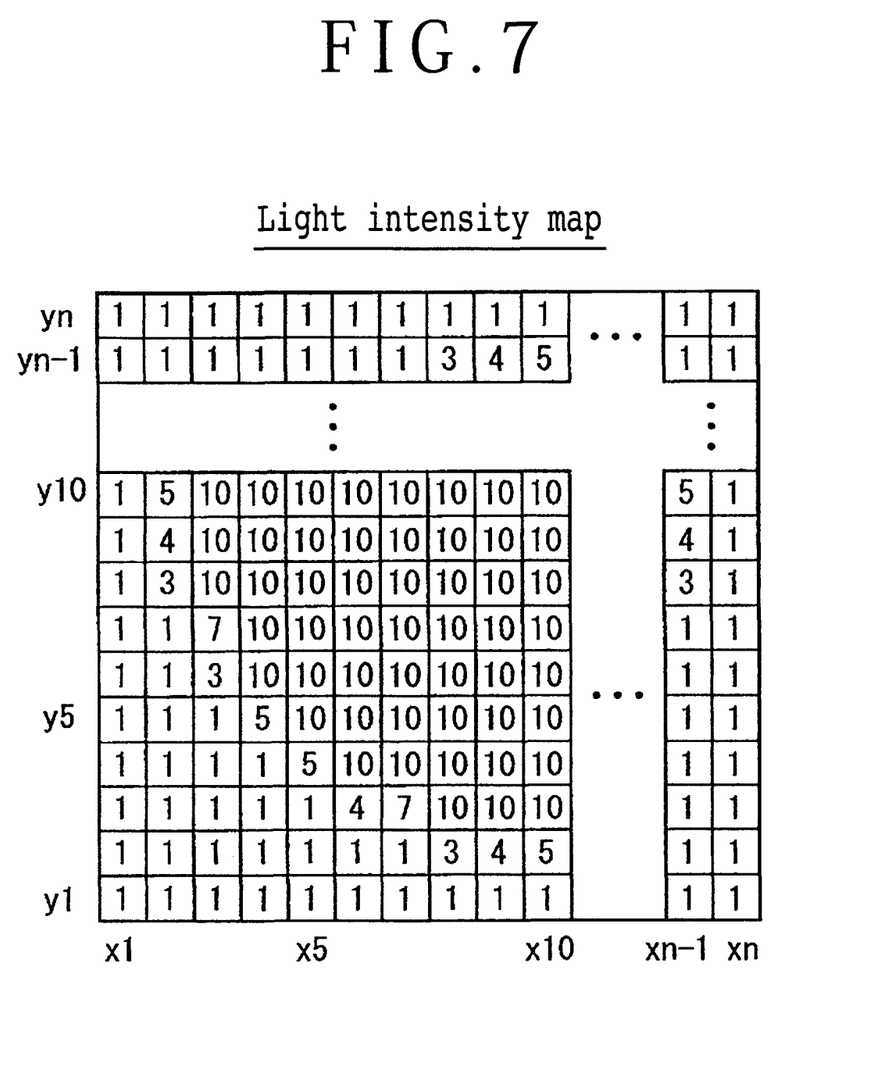
FIG. 7 is a schematic diagram showing a light intensity map prepared by a light intensity map preparing step in the laser beam spot shape detecting method according to the present invention.

After performing the light intensity detecting step from the coordinates (x1, y1) to the coordinates (xn, yn) at the first detection position (Z1), the control means 7 prepares a light intensity map indicating the light intensities at all of the coordinates (x, y) at the first detection position (Z1) as shown in FIG. 7 according to the intensities of the light emitted from the luminescent substance 9 at all of the coordinates (x, y) and stored in the random access memory (RAM) 73, and then stores this light intensity map into the random access memory (RAM) 73 (light intensity map preparing step).

After performing the light intensity detecting step and the light intensity map preparing step at the first detection position (Z1) as mentioned above, the control means 7 operates the Z-direction moving means 53 to lower the focusing means 524 of the laser beam applying means 52 in the Z direction by the amount of 0.1 μm, thereby setting the focusing means 524 at a second detection position (Z2). Thereafter, the light intensity detecting step and the light intensity map preparing step mentioned above are similarly performed at the second detection position (Z2). Thereafter, the Z-direction moving means 53 is operated to lower the focusing means 524 of the laser beam applying means 52 in the Z direction stepwise by the amount of 0.1 μm, thereby successively setting the focusing means 524 at a third detection position (Z3), a fourth detection position (Z4), and a fifth detection position (Z5). Every time the focusing means 524 is set at each of the third detection position (Z3), the fourth detection position (Z4), and the fifth detection position (Z5), the light intensity detecting step and the light intensity map preparing step mentioned above are similarly performed.

Figure 8:
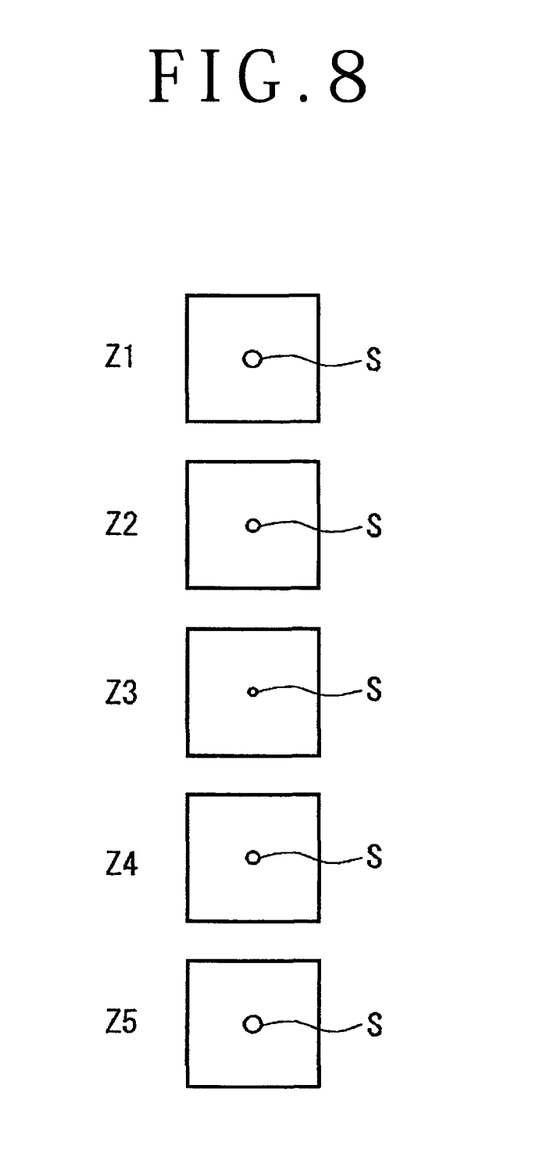
FIG. 8 is a schematic diagram for illustrating a spot shape image forming step in the laser beam spot shape detecting method according to the present invention.

Thereafter, the control means 7 forms spot shape images of the laser beam according to the light intensity maps at the plural detection positions (Z1 to Z5) (spot shape image forming step). As described above, the luminescent substance 9 is partially irradiated with the laser beam at the boundary of the spot S, so that the luminescent substance 9 emits light at relatively low intensity. Accordingly, the contour of the spot S can be obtained according to the coordinates (x, y) where the light intensity is relatively low in the spot shape image forming step. FIG. 8 shows the contours of plural spots S at the plural detection positions (Z1 to Z5) as obtained by the spot shape image forming step, and these images are displayed on the display means 70. Accordingly, the spot shape can be confirmed according to the contour of the spot S displayed on the display means 70. In FIG. 8, the spot S at the third detection position (Z3) has a minimum size (area). Accordingly, the spot S at the third detection position (Z3) becomes a focused spot, so that the size (area) of the focused spot can be obtained and the focal length of the focusing means 524 can also be accurately obtained. In the preferred embodiment shown in FIG. 8, the images at the first detection position (Z1) and the second detection position (Z2) show the condition where the focusing means 524 is positioned at the levels higher than the focal length of the focusing means 524, and the images at the fourth detection position (Z4) and the fifth detection position (Z5) show the condition where the focusing means 524 is positioned at the levels lower than the focal length of the focusing means 524. In the case that the spot shape formed by the spot shape image forming step mentioned above is different from a set shape, this different spot shape may have an adverse effect on the quality of laser processing. In this case, the focusing means is replaced or an optical system such as a combination lens in the focusing means is corrected.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser beam spot shape detecting method of detecting the spot shape of a laser beam oscillated by laser beam oscillating means and focused by focusing means, said laser beam spot shape detecting method comprising:

a detection substrate holding step of holding a detection substrate on a holding surface of a table movable in an X direction and a Y direction, said detection substrate having a photoluminescent substance formed from a minute particle capable of emitting light by the application of said laser beam thereto;

a laser beam applying step of applying said laser beam oscillated by said laser beam oscillating means and focused by said focusing means to an area of said detection substrate held on said table where said photoluminescent substance is located, said laser beam having a predetermined power that cannot process said detection substrate and said photoluminescent substance, the size of a spot of said laser beam on said detection substrate being larger than the size of said photoluminescent substance;

a light intensity detecting step of moving said table in said X direction and said Y direction relatively to said focusing means in the condition where said laser beam is applied to the area of said detection substrate held on said table where said photoluminescent substance is located and detecting the intensity of light emitted from said photoluminescent substance by using a photodetector during the movement of said table;

a light intensity map preparing step of preparing a light intensity map indicating the light intensities detected in said light intensity detecting step at all of the X and Y coordinates of said photoluminescent substance;

a spot shape image forming step of forming spot shape images of said laser beam according to a plurality of light intensity maps obtained by positioning said focusing means at a plurality of detection positions changed in a Z direction perpendicular to said holding surface of said table and performing said light intensity detecting step and said light intensity map preparing step at said plurality of detection positions, and a spot contour determining step of focusing the laser beam at a selected first one of the spots in a plurality of detection positions from which the size of the first spot and a first focal length of the focusing means can be obtained, focusing the laser beam at at least one second selected spot at a second focal length higher than the first focal length, and focusing the laser beam at at least one third selected spot at a third focal length lower than the first focal length, wherein during said light intensity detecting step, moving said table to cause the movement of said photoluminescent substance from an area where the spot of said laser beam is absent through an area where the spot is present to an area where the spot is absent.

2. The laser beam spot shape detecting method according to claim 1, wherein said photoluminescent substance has a particle size of 30 to 100 nm.

3. The laser beam spot shape detecting method according to claim 1, wherein said photoluminescent substance is provided by a single fluorescent particle.

* * * * *